US007671486B2

(12) United States Patent
Yang

(10) Patent No.: US 7,671,486 B2
(45) Date of Patent: Mar. 2, 2010

(54) SWITCHING CONTROLLER HAVING SYNCHRONOUS INPUT FOR THE SYNCHRONIZATION OF POWER CONVERTERS

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 530 days.

(21) Appl. No.: 11/554,601

(22) Filed: Oct. 31, 2006

(65) Prior Publication Data

US 2008/0100277 A1 May 1, 2008

(51) Int. Cl.
*H02J 1/00* (2006.01)

(52) U.S. Cl. ........................................................ 307/31

(58) Field of Classification Search .................. 307/31, 307/41, 35

See application file for complete search history.

(56) References Cited

U.S. PATENT DOCUMENTS 5,130,561 A * 7/1992 Elliott et al. .................. 307/31
5,903,452 A 5/1999 Yang
6,545,882 B2 4/2003 Yang
6,781,356 B1 8/2004 Yang et al.
7,423,893 B2 * 9/2008 Kogel et al. ................... 363/89
2005/0225178 A1 10/2005 Shao et al.

* cited by examiner

*Primary Examiner*—Shawn Riley
(74) *Attorney, Agent, or Firm*—Jianq Chyun IP Office

(57) ABSTRACT

A switching control circuit having a synchronous input for the synchronization of power converters is provided. It includes a synchronous input circuit for receiving a synchronous input signal. An oscillation circuit is connected to the synchronous input circuit for generating an oscillation signal in response to the synchronous input signal. A signal converter is coupled to receive a feedback signal of the power converter for modulating the oscillation signal in response to the feedback signal for achieving power savings. The oscillation signal is connected for enabling the switching signal of the power converter. The switching signal can be synchronized with the synchronous input signal immediately after the synchronous input signal is inputted. Otherwise, the switching signal will be running free.

26 Claims, 7 Drawing Sheets

SWITCHING CONTROLLER HAVING SYNCHRONOUS INPUT FOR THE SYNCHRONIZATION OF POWER CONVERTERS

BACKGROUND OF THE INVENTION

1. Field of Invention

The present invention relates in general to power converters, and more particularly, to the control circuit for switching power converters.

2. Description of Related Art

Power converters have been used for converting an unregulated power source to a regulated voltage and/or current source. The control circuit of the power converter generates a switching signal for the power regulation. The duty cycle of the switching signal is modulated in accordance with the output of the power converter. The switching frequency of the switching signal generally is self-determining in the control circuit of the power converter. To reduce the switching noise and the EMI (electrical and magnetic interference) while more than one switching power converters are used in a system, the synchronization of the switching signal is required. However, in recent developments, many PWM (pulse width modulation) control circuits have been proposed for power converters for saving power losses, such as "PWM controller having off-time modulation for power converter" by Yang, U.S. Pat. No. 6,545,882; "PWM controller having a modulator for saving power and reducing acoustic noise" by Yang, et al, U.S. Pat. No. 6,781,356. The switching frequency of the above prior arts is varied in response to the change of the load, which causes difficulties for the control circuit to synchronize the switching signal with other power converters. Besides, the fast synchronization of the switching signal is required. A slow phase locking of the switching frequency will generate jitters and acoustic noises in the power supply. Furthermore, due to the variability in load conditions, the synchronization of the switching signal may cause an unstable supply voltage during the turning-on of the power converter.

SUMMARY OF THE INVENTION

The present invention provides a synchronous control circuit for variable switching frequency power converter. It includes a synchronous input circuit generating a first signal in response to a synchronous input signal. A soft start circuit generates a soft start signal while the power converter is turned on. An enable circuit is coupled to generate a second signal in response to the first signal and the soft start signal. An oscillation circuit is connected to the synchronous input circuit and the enable circuit for generating an oscillation signal in response to the first signal and the second signal. In addition, a signal converter is coupled to the oscillation circuit. The signal converter is connected to receive a feedback signal of the power converter for modulating the switching frequency of the oscillation signal. The oscillation signal is further coupled to generate the switching signal of the power converter and determine the maximum duty cycle of the switching signal. The maximum duty cycle of the switching signal is changed in response to the synchronous input signal. Therefore, the switching signal can be immediately synchronized with the synchronous input signal once the synchronous input signal is inputted, and the second signal is enabled. Otherwise, the switching signal will be running free.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE PREFERRED EMBODIMENT

Figure 1:
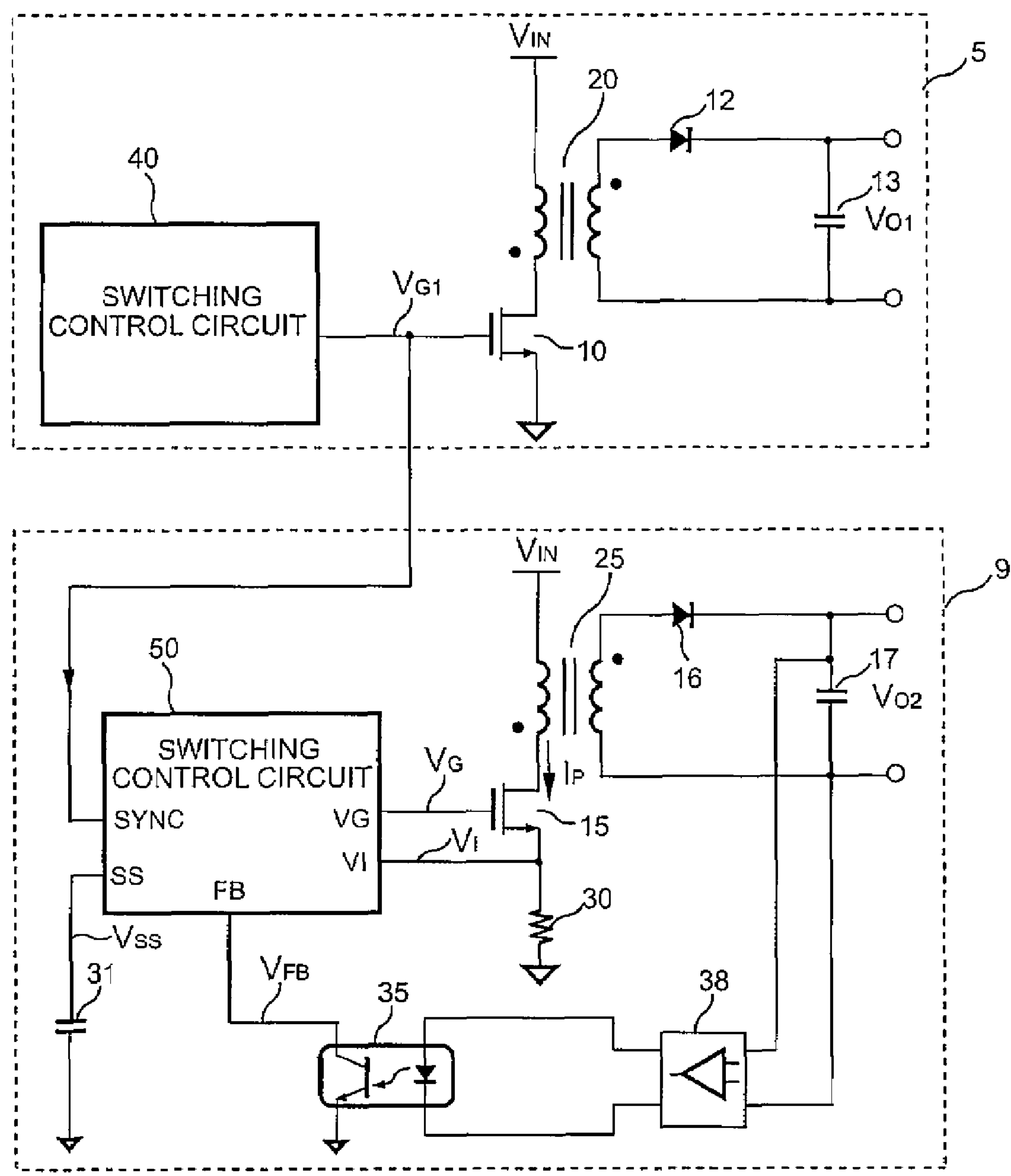
FIG. 1 shows a circuit diagram of two power converters having synchronous switching, according to one embodiment of the present invention.

FIG. 1 shows a circuit diagram of two power converters having synchronous switching. A first power converter 5 includes a transformer 20 coupled between an input voltage $V_{IN}$ and a ground to generate an output voltage $V_{O1}$. A transistor 10 is connected in series to the primary side of the transformer 20 and the ground. A rectifier 12 is coupled to the secondary side of the transformer 20. A filter capacitor 13 is coupled to the rectifier 12 and the secondary side of the transformer 20. A switching control circuit 40 of the first power converter 5 generates a switching signal $V_{G1}$ transmitted to the transistor 10 for switching the transformer 20 and regulating the output voltage $V_{O1}$. Meanwhile, the switching signal $V_{G1}$ is coupled to a synchronous input terminal SYNC of a switching control circuit 50 of a second power converter 9 for the synchronous switching.

A transformer 25 of the second power converter 9 is coupled between the input voltage $V_{IN}$ and the ground for generating an another output voltage $V_{O2}$. The transformer 25 is further connected in series with a transistor 15. A resistor 30 is connected to the transistor 15 to generate a current signal $V_I$ by detecting a switching current $I_P$ of the transformer 25. The current signal $V_I$ is coupled to a current sense input terminal VI of the switching control circuit 50. A capacitor 31 is connected to a soft start terminal SS of the switching control circuit 50 to provide the soft start for the output voltage $V_{O2}$ when the power converter 9 is turned on. The secondary side of the transformer 25 is coupled to a rectifier 16 and a filter capacitor 17. The filter capacitor 17 is connected in series with the rectifier 16. An error amplifier 38 is coupled to the output terminal of the second power converter 9. The output terminal of the error amplifier 38 is connected to an optical coupler 35. The output terminal of the optical coupler 35 generates a feedback signal $V_{FB}$. A feedback input terminal FB of the switching control circuit 50 is coupled to the optical coupler 35 to receive the feedback signal $V_{FB}$. The feedback input terminal FB is coupled to the output terminal of the second power converter 9 through the optical coupler 35 and the error amplifier 38. In accordance with the feedback signal $V_{FB}$, an output terminal VG of the switching control circuit 50 will generate a switching signal $V_G$ to switch the transformer 25 and regulate the output voltage $V_{O2}$ through the transistor 15. The switching of the switching signal $V_G$ is synchronized with the switching signal $V_{G1}$.

Figure 2:
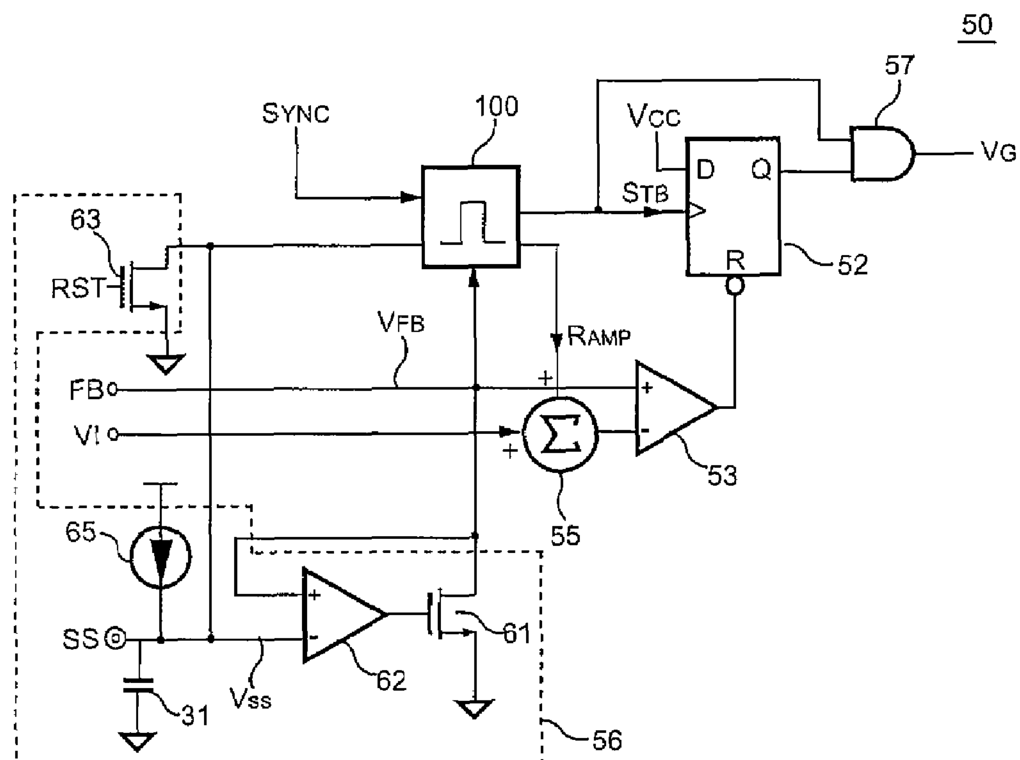
FIG. 2 shows a circuit diagram of a switching control circuit according to one embodiment of the present invention.

The circuit diagram of the switching control circuit 50 is shown in FIG. 2. It includes a controller 100 coupled to the synchronous input terminal SYNC, the feedback input terminal FB, and the soft start terminal SS of the switching control circuit 50 for generating a ramp signal RAMP and an oscillation signal $S_{TB}$. The synchronous input signal $S_{YNC}$ is connected to the controller 100. An AND gate 57 is applied to generate the switching signal $V_G$. An input terminal of the AND gate 57 is connected to the controller 100 for receiving the oscillation signal $S_{TB}$, in which the oscillation signal $S_{TB}$ determines the maximum duty cycle of the switching signal $V_G$. Another input terminal of the AND gate 57 is connected to an output terminal Q of a flip-flop 52. An output signal of the flip-flop 52 is enabled in response to the enabling of the oscillation signal $S_{TB}$. A reset input terminal R of the flip-flop 52 is connected to an output of a comparator 53. A positive input terminal and a negative input terminal of the comparator 53 are coupled to the feedback input terminal FB and an output terminal of an adder 55 to receive the feedback signal $V_{FB}$ and a saw-tooth signal $V_{SAW}$, respectively. The saw-tooth signal $V_{SAW}$ is generated from the adder 55 by adding the current signal $V_I$ with the ramp signal RAMP. Therefore, the output signal of the flip-flop 52 is disabled once the saw-tooth signal $V_{SAW}$ is higher than the feedback signal $V_{FB}$. The ramp signal RAMP provides the slope compensation to stabilize the feedback loop. The "Adaptive slope compensator for current mode power converters" by Yang, U.S. Pat. No. 5,903,452 describes the slope compensation for the control loop. A soft start circuit 56 comprises a transistor 61, a operational amplifier 62, a transistor 63, a constant current source 65, and the capacitor 31. The constant current source 65 and the transistor 63 are connected to the soft start terminal SS. The transistor 63 is controlled by a reset signal RST to discharge the capacitor 31 in FIG. 1 when the power converter 9 is turned on. After that, the constant current source 65 will charge the capacitor 31 and the soft start circuit 56 generate a soft start signal $V_{SS}$. The soft start signal $V_{SS}$ is connected to the controller 100 and the input of an operational amplifier 62. The operational amplifier 62 connected to the gate of the transistor 61 is operated as an open-drain buffer amplifier. The output of the open-drain buffer amplifier is coupled to the feedback input terminal FB. Therefore, the feedback signal $V_{FB}$ will follow the soft start signal $V_{SS}$ to achieve the soft start when the power converter 9 is turned on.

Figure 3:
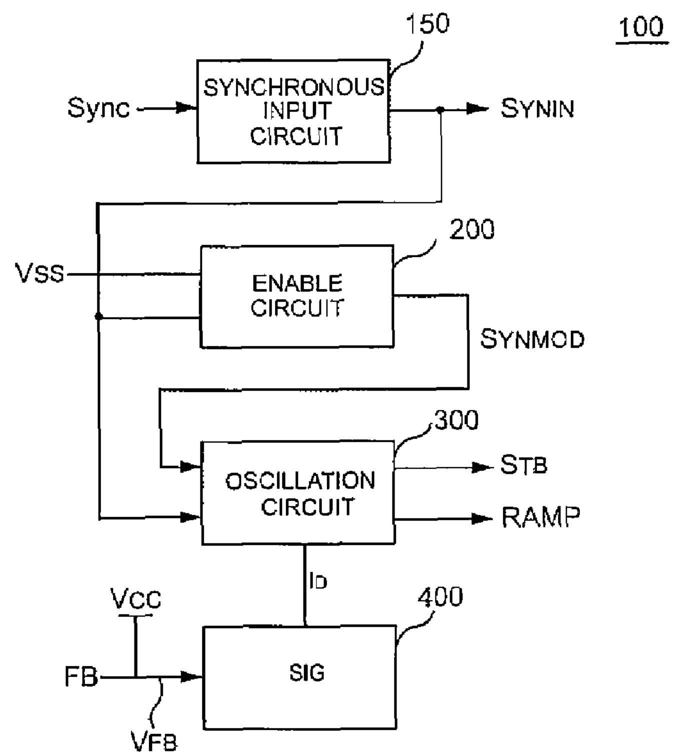
FIG. 3 shows a circuit diagram of a synchronous controller of the switching control circuit, according to one embodiment of the present invention.

As shown in FIG. 3, the controller 100 includes a synchronous input circuit 150 coupled to the synchronous input terminal SYNC for receiving the synchronous input signal $S_{YNC}$ for generating a first signal $S_{YNIN}$ in response to the leading edge of the synchronous input signal $S_{YNC}$. The synchronous input signal $S_{YNC}$ is inputted from the switching signal $V_{G1}$ of the power converter 5 as shown in FIG. 1. The first signal $S_{YNIN}$ is produced as a one-shot pulse. The input of an enable circuit 200 is coupled to the first signal $S_{YNIN}$ and the soft start signal $V_{SS}$ to generate a second signal $S_{YNMOD}$. The second signal $S_{YNMOD}$ is generated once that the first signal $S_{YNIN}$ is generated and that the voltage of the soft start signal $V_{SS}$ is higher than a threshold $V_R$. The enabling of the second signal $S_{YNMOD}$ indicated that the synchronous input signal $S_{YNC}$ is inputted and that the soft start is completed, which is allowed in the synchronous operation. An oscillation circuit 300 is coupled to the output terminals of the synchronous input circuit 150 and the enable circuit 200 for receiving the first signal $S_{YNIN}$ and the second signal $S_{YNMOD}$ to generate the oscillation signal $S_{TB}$ and the ramp signal RAMP. A signal converter 400 is coupled to the feedback input terminal FB for generating a discharge current signal $I_D$ in accordance with the feedback signal $V_{FB}$. The discharge current signal $I_D$ is used by the oscillation circuit 300 to produce the oscillation signal $S_{TB}$. The switching frequency of the oscillation signal $S_{TB}$ is proportional to the discharge current signal $I_D$. Besides, the discharge current signal $I_D$ is decreased corresponding to the decrease of the feedback signal $V_{FB}$. The oscillation signal $S_{TB}$ is used to enable the switching signal $V_G$. Therefore, the switching frequency of the oscillation signal $S_{TB}$ and the switching signal $V_G$ will be decreased at light load for achieving power saving.

Figure 4:
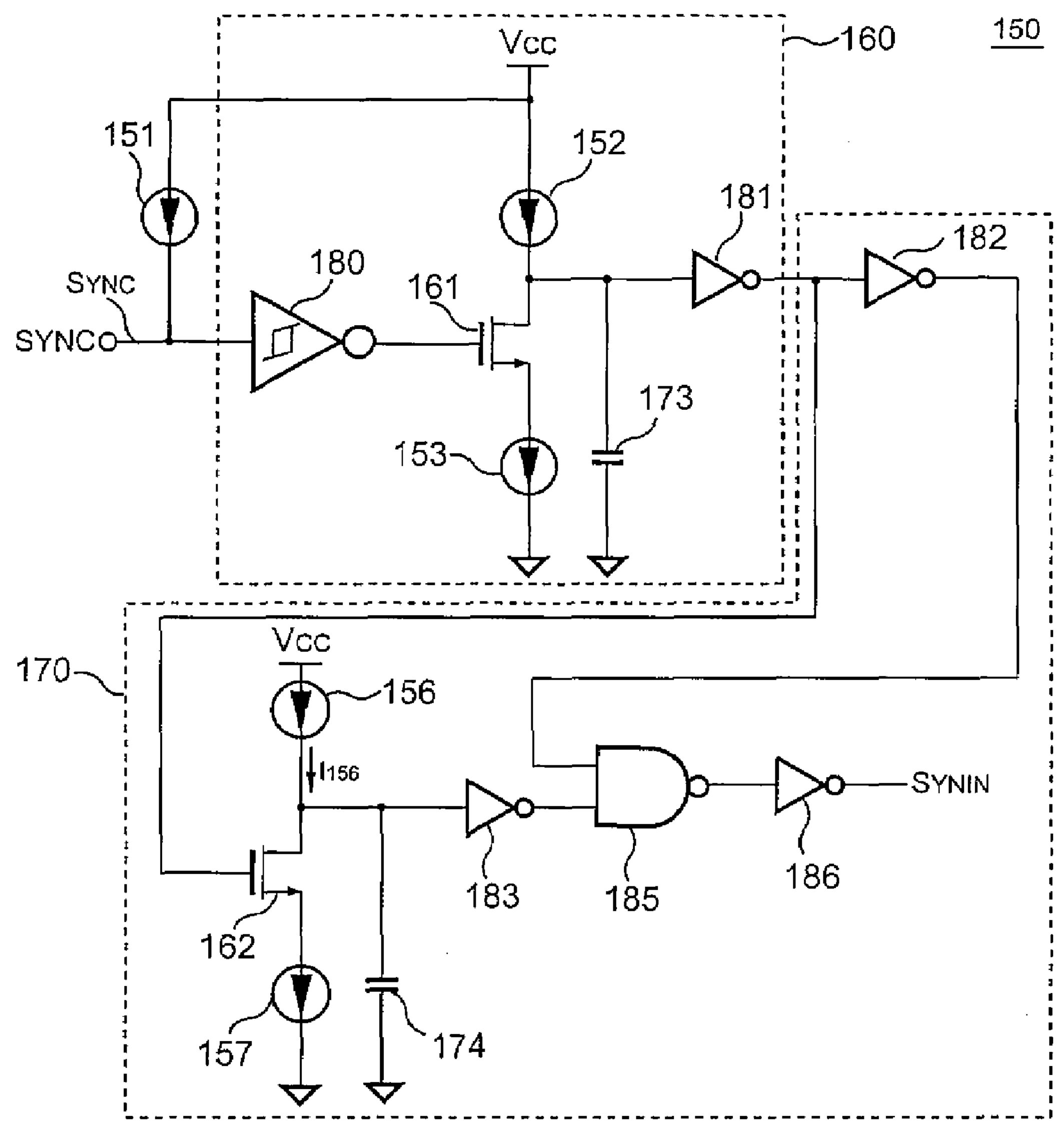
FIG. 4 shows a circuit diagram of a synchronous input circuit of the synchronous controller, according to one embodiment of the present invention.

The circuit diagram of the synchronous input circuit 150 is shown in FIG. 4. A current source 151 is connected between the synchronous input terminal SYNC and the supply voltage $V_{CC}$ to pull high the synchronous input signal $S_{YNC}$. A debounce circuit 160 includes a transistor 161, a capacitor 173, a plurality of current sources 152, 153 and a plurality of inverters 180, 181 to filter the input noise and to provide the debounce to the synchronous input signal $S_{YNC}$. The debounce circuit 160 is coupled to the synchronous input terminal SYNC to receive the synchronous input signal $S_{YNC}$ and generate an input signal in accordance with the synchronous input signal $S_{YNC}$. The current source 152 is coupled between the supply voltage $V_{CC}$ and the capacitor 173 to charge the capacitor 173. A drain of the transistor 161 is coupled to the capacitor 173. The current source 153 is coupled between a source of the transistor 161 and the ground to discharge the capacitor 173 via the transistor 161. A gate of the transistor 161 is coupled to an output terminal of the inverter 180. An input terminal of the inverter 180 is connected to the synchronous input terminal SYNC. An input terminal of the inverter 181 is coupled to the capacitor 173. An output terminal of the inverter 181 generates the input signal coupled to the input of a one-shot circuit 170. The one-shot circuit 170 comprises a transistor 162, a capacitor 174, a NAND gate 185, a plurality of current sources 156, 157 and a plurality of inverters 182, 183, 186. An input terminal of the inverter 182 and a gate of the transistor 162 are connected to the output terminal of the inverter 181 to receive the input signal. The current source 156 is coupled between the supply voltage $V_{CC}$ and the capacitor 174 to charge the capacitor 174. A drain of the transistor 162 is connected to the capacitor 174. The current source 157 is coupled between the ground and a source of the transistor 162 to discharge the capacitor 174 through the transistor 162. The inverter 183 is coupled between the capacitor 174 and an input terminal of the NAND gate 185. Another input terminal of the NAND gate 185 is coupled to an output terminal of the inverter 182. An output terminal of the NAND gate 185 is connected to an input terminal of the inverter 186. An output terminal of the inverter 186 generates the first signal $S_{YNIN}$. The one-shot circuit 170 is coupled to the output terminal of the debounce circuit 160 to receive the input signal for generating the first signal $S_{YNIN}$ in response to the rising edge of the input signal. The current $I_{156}$ of the current source 156 and the capacitance of the capacitor 174 determine the pulse width of the first signal $S_{YNIN}$. The pulse width of the first signal $S_{YNIN}$ is to be shorter than the pulse width of the input signal.

Figure 5:
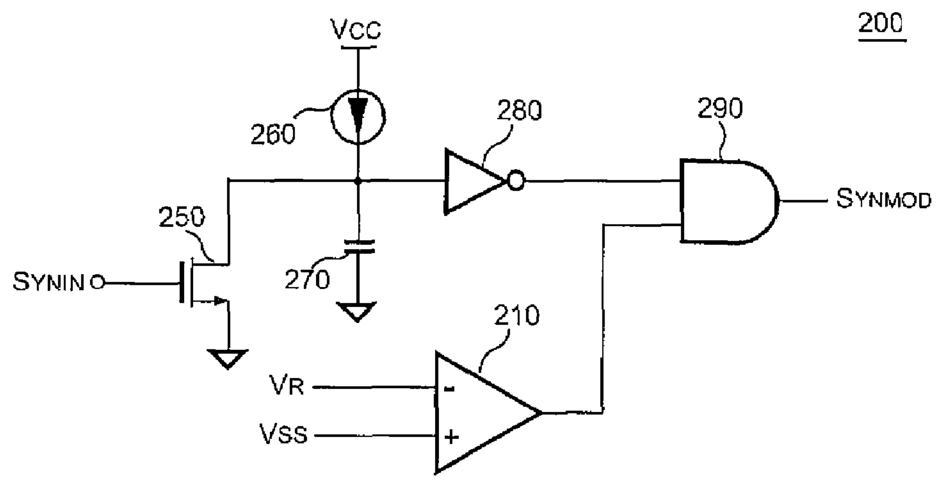
FIG. 5 shows a circuit diagram of an enable circuit of the synchronous controller, according to one embodiment of the present invention.

FIG. 5 shows the circuit diagram of the enable circuit 200. The first signal $S_{YNIN}$ is connected to the gate of a transistor 250 for discharging a capacitor 270. A current source 260 is connected to the capacitor 270 to charge the capacitor 270 upon when the first signal $S_{YNIN}$ is disabled. An inverter 280 is connected to the capacitor 270. The output of the inverter 280 is connected to the input of an AND gate 290. Another input of the AND gate 290 is coupled to the output of a comparator 210. The positive input of the comparator 210 is connected to the soft start signal $V_{SS}$. The negative input of the comparator 210 is the threshold $V_R$. The output of the AND gate 290 thus generates the second signal $S_{YNMOD}$ once the first signal $S_{YNIN}$ is generated and the voltage of the soft start signal $V_{SS}$ is higher than the threshold $V_R$.

Figure 6:
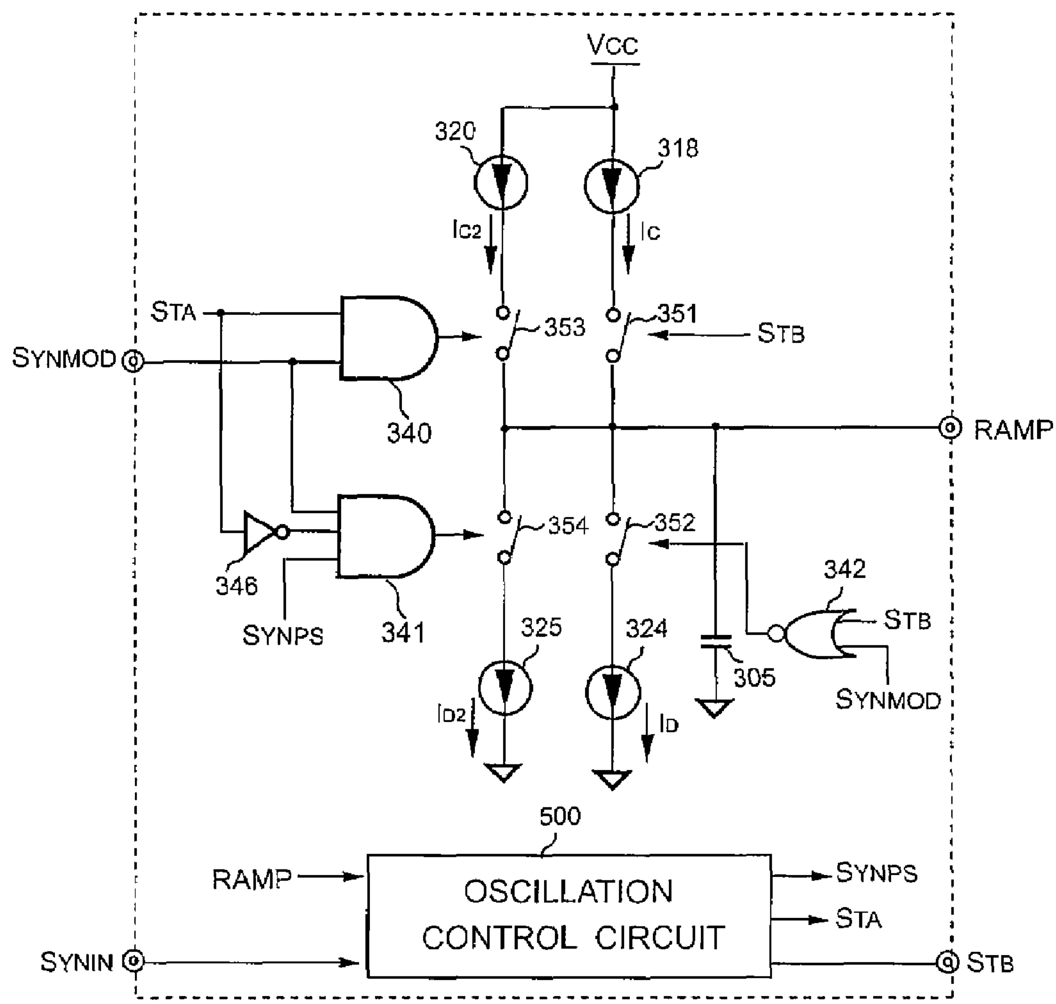
FIG. 6 shows a circuit diagram of an oscillation circuit of the synchronous controller, according to one embodiment of the present invention.

FIG. 6 shows the circuit diagram of the oscillation circuit 300. A capacitor 305 is used for generating the ramp signal RAMP. A first charge current source 318 is coupled to the supply voltage $V_{CC}$. A switch 351 is coupled between the first charge current source 318 and the capacitor 305. A switch 352 is coupled between a first discharge current source 324 and the capacitor 305. The first discharge current source 324 generates a first discharge current $I_D$ A first charge current $I_C$ of the first charge current source 318 and the first discharge current $I_D$ of the first discharge current source 324 are coupled to the capacitor 305 through the switch 351 and the switch 352, respectively. A second charge current source 320 and a second discharge current source 325 are coupled directly or indirectly to the supply voltage $V_{CC}$ and the ground, respectively. A switch 353 is coupled between the second charge current source 320 and the capacitor 305. A switch 354 is coupled between the second discharge current source 325 and the capacitor 305. A second charge current $I_{C2}$ of the second charge current source 320 and a second discharge current $I_{D2}$ of the second discharge current source 325 are coupled to the capacitor 305 via the switch 353 and the switch 354, correspondingly.

An oscillation control circuit 500 is coupled to the capacitor 305 and the synchronous input circuit 150 to generate the oscillation signal $S_{TB}$, a sync-charge signal $S_{TA}$, and a sync-discharge signal $S_{YNPS}$ in response to the ramp signal RAMP and the first signal $S_{YNIN}$, wherein the ramp signal RAMP in response to the second signal $S_{YNMOD}$ The switch 351 is controlled by the oscillation signal $S_{TB}$. The oscillation signal $S_{TB}$ and the second signal $S_{YNMOD}$ are transmitted to the input terminals of an NOR gate 342 to enable the switch 352. The sync-charge signal $S_{TA}$ and the second signal $S_{YNMOD}$ are connected to the input terminals of an AND gate 340 to enable the switch 353. The sync-charge signal $S_{TA}$ is further transmitted to an input terminal of an inverter 346. An output terminal of the inverter 346 is connected to a first input terminal of an AND gate 341. A second input terminal and a third input terminal of the AND gate 341 receive the sync-discharge signal $S_{YNPS}$ and the second signal $S_{YNMOD}$, respectively. Therefore, the oscillation signal $S_{TB}$ is used to enable the first charge current $I_C$ for charging the capacitor 305. The first discharge current $I_D$ is enabled for discharging the capacitor 305 upon when the oscillation signal $S_{TB}$ and the second signal $S_{YNMOD}$ are disabled. The second charge current $I_{C2}$ is enabled for charging the capacitor 305 in response to the enabling of the sync-charge signal $S_{TA}$ and the second signal $S_{YNMOD}$ The second discharge current $I_{D2}$ is enabled for discharging the capacitor 305 in response to the enabling of the sync-discharge signal $S_{YNPS}$, the enabling of the second signal $S_{YNMOD}$, and the disabling of the sync-charge signal $S_{TA}$.

Figure 7:
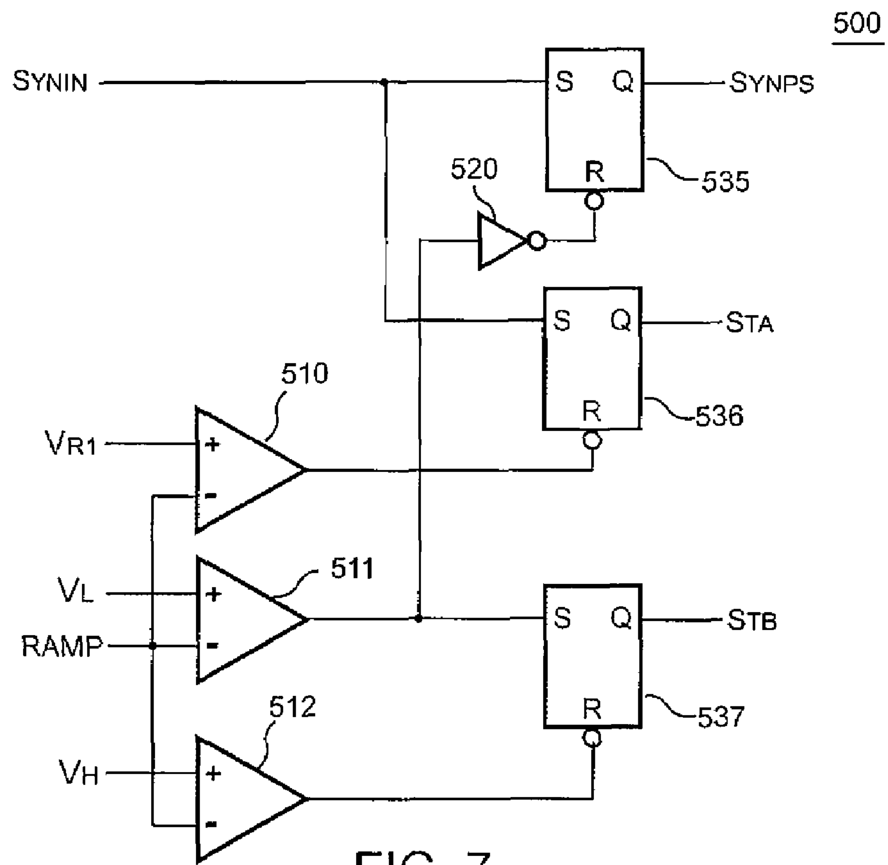
FIG. 7 shows a circuit diagram of an oscillation control circuit of the oscillation circuit, according to one embodiment of the present invention.

The circuit diagram of the oscillation control circuit 500 is shown in FIG. 7. The ramp signal RAMP is coupled to each negative input terminal of a plurality of comparators 510, 511, and 512. The positive input terminals of the comparators 510, 511 and 512 receive a plurality of trip-point voltages, namely $V_{R1}$, $V_L$, and $V_H$, respectively. An output terminal of the comparator 510 is connected to a reset input terminal R of a third flip-flop 536 to reset the third flip-flop 536. The comparator 511 is applied to set a first flip-flop 537. The comparator 511 is further applied to reset a second flip-flop 535 through an inverter 520. An output terminal of the comparator 511 is coupled to a set input terminal S of the first flip-flop 537 and an input terminal of the inverter 520. An output terminal of the inverter 520 is coupled to a reset input terminal R of the second flip-flop 535 to reset the second flip-flop 535. The first signal $S_{YNIN}$ is transmitted to the set input terminals S of the second flip-flop 535 and of the third flip-flop 536 for setting the second flip-flop 535 and the third flip-flop 536, respectively. The comparator 512 is coupled to a reset input terminal R of the first flip-flop 537 for resetting the first flip-flop 537. The first flip-flop 537 is used to generate the oscillation signal $S_{TB}$. The oscillation signal $S_{TB}$ is enabled when the ramp signal RAMP is lower than the first trip-point voltage $V_L$. The oscillation signal $S_{TB}$ is disabled when the ramp signal RAMP is higher than the second trip-point voltage $V_H$. The second flip-flop 535 is utilized to generate the sync-discharge signal $S_{YNPS}$. The sync-discharge signal $S_{YNPS}$ is enabled in response to the enabling of the first signal $S_{YNFN}$. The sync-discharge signal $S_{YNPS}$ is disabled when the ramp signal RAMP is lower than the first trip-point voltage $V_L$. The third flip-flop 536 is used to generate the sync-charge signal $S_{TA}$. The sync-charge signal $S_{TA}$ is enabled in response to the enabling of the first signal $S_{YNIN}$. The sync-charge signal $S_{TA}$ is disabled upon when the ramp signal RAMP is higher than the third trip-point voltage $V_{R1}$. The third trip-point voltage $V_{R1}$ is higher than the second trip-point voltage $V_H$. The second trip-point voltage $V_H$ is higher than the first trip-point voltage $V_L$ Therefore, the oscillation signal $S_{TB}$ is generated after the generation of the first signal $S_{YNIN}$ upon when the second signal $S_{YNMOD}$ is enabled.

Figure 9A:
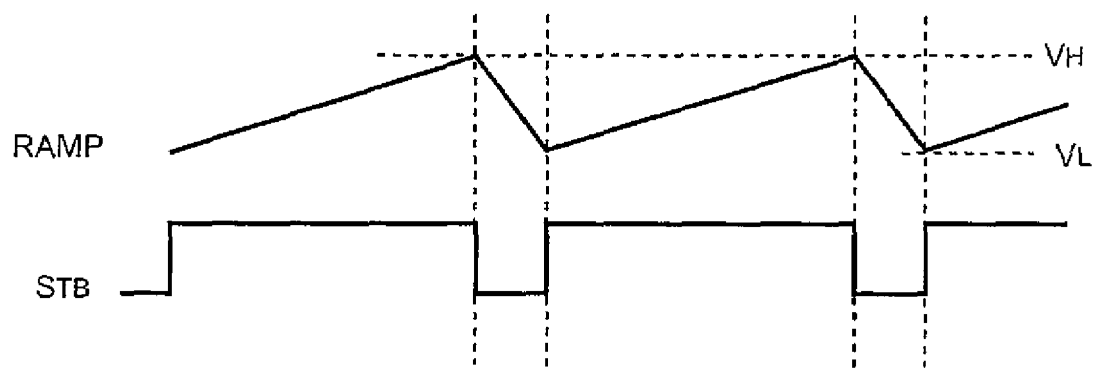
FIG. 9A shows the waveforms of the ramp signal RAMP and the oscillation signal $S_{TB}$ during which the switching signal is running free.
Figure 9B:
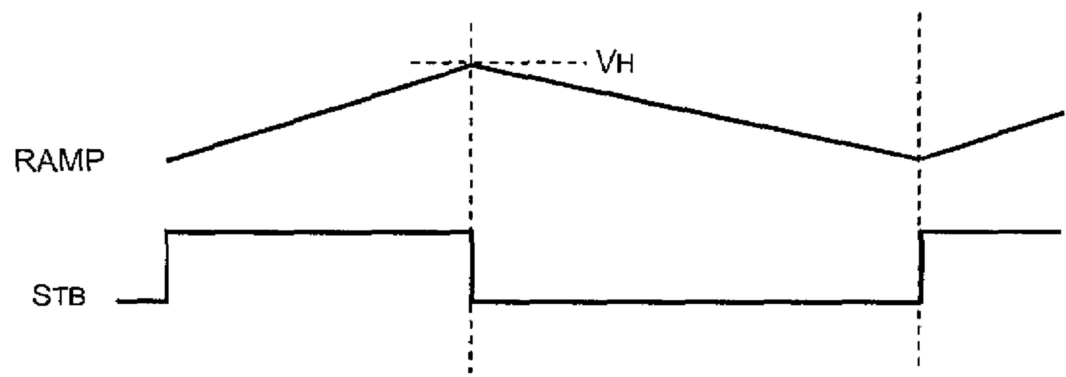
FIG. 9B shows the waveforms of the ramp signal RAMP and the oscillation signal $S_{TB}$ during which the switching signal is running free when the power converter is operating at the power saving mode.
Figure 9C:
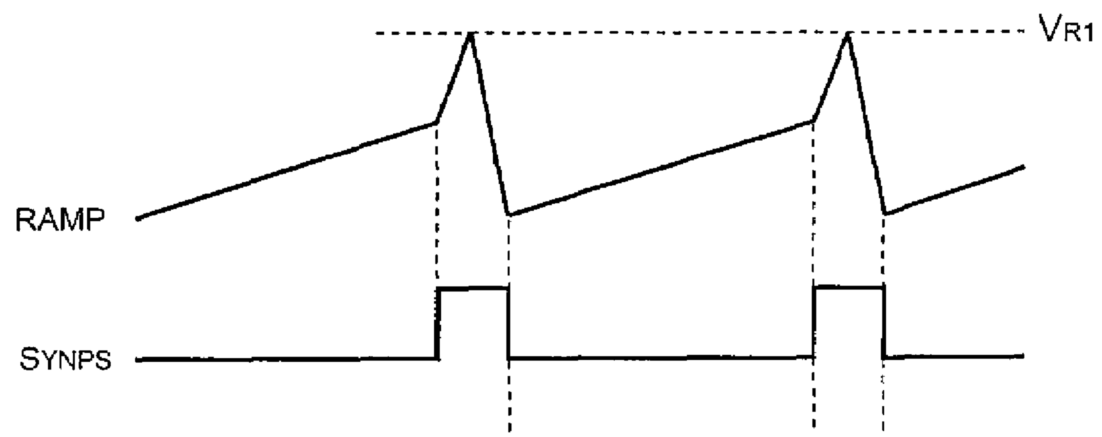
FIG. 9C shows the waveforms of the ramp signal RAMP and the sync-discharge signal $S_{YNPS}$ when the switching signal is synchronized with the synchronous input signal.
Figure 9D:
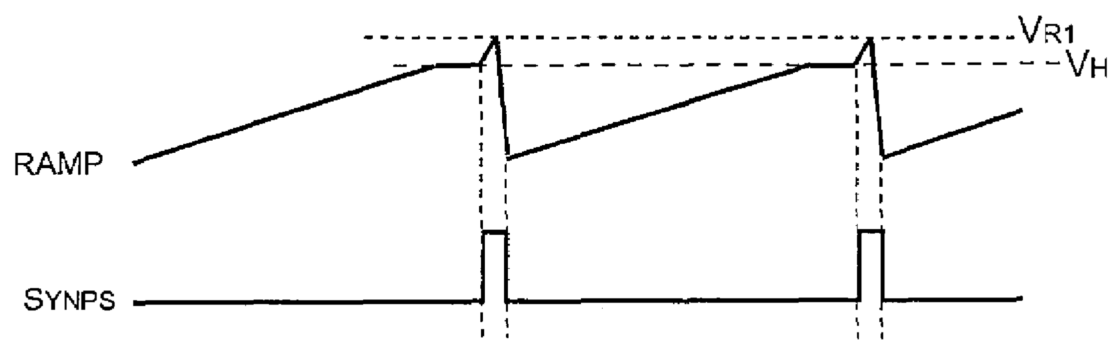
FIG. 9D shows the waveforms of the ramp signal RAMP and the sync-discharge signal $S_{YNPS}$ when the switching signal is synchronized with the synchronous input signal during which the power converter is operating at the power saving mode.

A plurality of waveforms of the ramp signal RAMP and the oscillation signal $S_{TB}$ under the conditions of the switching signal $V_G$ running free are shown in FIGS. 9A and 9B. FIGS. 9C and 9D show the waveforms of the ramp signal RAMP and the sync-discharge signal $S_{YNPS}$ upon when the switching signal $V_G$ is synchronized with the synchronous input signal $S_{YNC}$. The ramp signal RAMP is synchronized with the sync-discharge signal $S_{YNPS}$. The waveforms of FIGS. 9B and 9D show that the second power converter 9 is operated at the power saving mode, in which switching frequency is reduced.

The ramp signal RAMP and the sync-discharge signal $S_{YNPS}$ are synchronized with the synchronous input signal $S_{YNC}$. The ramp signal RAMP is used to generate the oscillation signal $S_{TB}$. The oscillation signal $S_{TB}$ is applied to generate the switching signal $V_G$ and determine the maximum duty cycle of the switching signal $V_G$. Therefore, the maximum duty cycle of the switching signal $V_G$ is changed in response to the synchronous input signal $S_{YNC}$. The switching signal $V_G$ can be synchronized with the synchronous input signal $S_{YNCS}$ within one switching cycle of the switching signal $V_G$ after the synchronous input signal $S_{YNC}$ is inputted. Otherwise, the switching signal $V_G$ will be running free.

Figure 8:
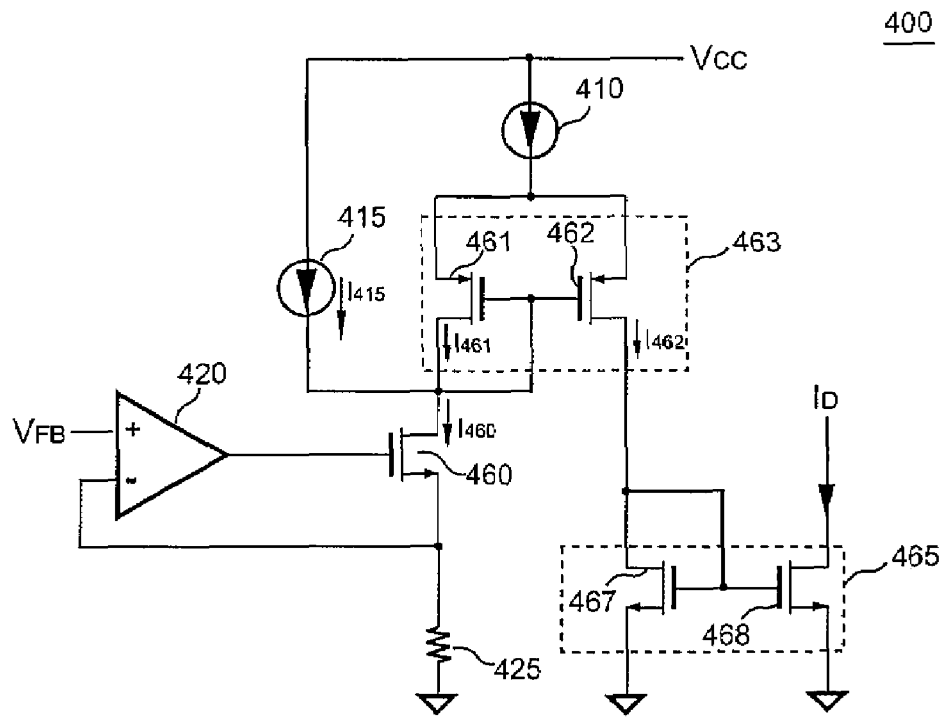
FIG. 8 shows a circuit diagram of a signal converter, according to one embodiment of the present invention.

FIG. 8 shows the circuit diagram of the signal converter 400 that is used for generating the discharge current signal $I_D$. A positive input terminal of an operational amplifier 420 receives the feedback signal $V_{FB}$. A negative input terminal of the operational amplifier 420 is coupled to a source of a transistor 460. An output terminal of the operational amplifier 420 is coupled to a gate of the transistor 460. A drain of the transistor 460 outputs a current $I_{460}$. A resistor 425 is coupled between the source of the transistor 460 and the ground. The operational amplifier 420, the transistor 460, and the resistor 425 generate the current $I_{460}$ in response to the feedback signal $V_{FB}$. The current $I_{460}$ is decreased corresponding to the decrease of the feedback signal $V_{FB}$.

A first current mirror 463 includes a plurality of transistors 461 and 462. The sources of the transistors 461, 462 are coupled to a current source 410. The current source 410 is further coupled to the supply voltage $V_{CC}$. The gates of the transistors 461, 462 and the drains of the transistors 460,461 are connected together. A current source 415 is coupled between the drain of the transistor 460 and the supply voltage $V_{CC}$. A second current mirror 465 includes a plurality of transistors 467 and 468. The gates of the transistors 467, 468 and the drains of the transistors 462, 467 are coupled together. The sources of the transistors 467, 468 are coupled to the ground. The drain of the transistors 468 generates the discharge current signal $I_D$. The current $I_{460}$ subtracts a current $I_{415}$ of a current source 415 to produce a current $I_{461}$ transmitted to the first current mirror 463. The first current mirror 463 produces a current $I_{462}$ in response to the current $I_{461}$. The maximum current of the current $I_{462}$ is limited by the current source 410. The current $I_{462}$ is connected to the second current mirror 465 to produce the discharge current signal $I_D$. The maximum current of the discharge current signal $I_D$ is thus restricted. Besides, the discharge current signal $I_D$ is decreased corresponding to the decrease of the feedback signal $V_{FB}$ for achieving power savings.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A switching controller of a power converter, comprising:

a synchronous input circuit generating a first signal in response to a synchronous input signal;

a soft start circuit generating a soft start signal;

an enable circuit coupled to generate a second signal in response to the first signal and the soft start signal; and an oscillation circuit coupled to the synchronous input circuit and the enable circuit for generating an oscillation signal in response to the first signal and the second signal, wherein the oscillation signal is coupled to generate the switching signal of the power converter and determine the maximum duty cycle of the switching signal; the maximum duty cycle of the switching signal is changed in response to the synchronous input signal; the switching signal is synchronized with the synchronous input signal when the second signal is enabled; the switching signal is running free once the second signal is disabled.

2. The switching controller as claimed in claim 1, further comprising a signal converter coupled to the oscillation circuit, wherein the signal converter receives a feedback signal of the power convener to generate a modulation signal coupled to the oscillation circuit, and the oscillation signal is modulated in response to the modulation signal.

3. The switching controller as claimed in claim 1, wherein the second signal is enabled upon when the voltage of the soft start signal is higher than a threshold voltage.

4. The switching controller as claimed in claim 1, wherein the oscillation signal is synchronized with the synchronous input signal after the generation of the first signal when the second signal is enabled.

5. The switching controller as claimed in claim 1, wherein the synchronous input circuit comprises:

a debounce circuit for receiving the synchronous input signal and generating an input signal corresponding to the synchronous input signal; and a one-shot circuit coupled ,to the debounce circuit for generating the first signal in response to the rising edge of the input signal, wherein the pulse width of the first signal is shorter than the pulse width of the input signal.

6. The switching controller as claimed in claim 1, wherein the oscillation circuit comprises:

a capacitor for generating a ramp signal;

a first charge current coupled to the capacitor;

a first discharge current coupled to the capacitor;

a second charge current coupled to the capacitor;

a second discharge current coupled to the capacitor; and an oscillation control circuit coupled to the capacitor and the synchronous input circuit for generating the oscillation signal, a sync-charge signal, and a sync-discharge signal in response to the ramp signal and the first signal, wherein the oscillation signal is used to enable the first charge current; the first discharge current is enabled when the oscillation signal and the second signal are disabled; the second charge current is enabled in response to the enabling of the sync-charge signal and of the second signal; the second discharge current is enabled in response to the enabling of the sync-discharge signal, the enabling of the second signal, and the disabling of the sync-charge signal.

7. The switching controller as claimed in claim 6, wherein the oscillation control circuit comprises:

a first flip-flop for generating the oscillation signal, wherein the oscillation signal is enabled when the ramp signal is lower than a first trip-point voltage, and the oscillation signal is disabled when the ramp signal is higher than a second trip-point voltage;

a second flip-flop for generating the sync-discharge signal, wherein the sync-discharge signal is enabled in response to the enable of the first signal, and the sync-discharge signal is disabled when the ramp signal is lower than the first trip-point voltage; and a third flip-flop for generating the sync-charge signal, wherein the sync-charge signal is enabled in response to the enable of the first signal, and the sync-charge signal is disabled when the ramp signal is higher than a third trip-point voltage, wherein the third trip-point voltage is higher than the second trip-point voltage, and the second trip-point voltage is higher than the first trip-point voltage.

8. A switching control circuit of a power converter, comprising:

a synchronous input circuit for generating a first signal in response to a synchronous input signal;

an oscillation circuit coupled to the synchronous input circuit for receiving the first signal and generating an oscillation signal response to the first signal, wherein the oscillation signal is utilized to generate a switching signal of the power converter and determine a maximum duty cycle of the switching signal; the maximum duty cycle of the switching signal is changed in response to the synchronous input signal; the switching signal is synchronized with the synchronous input signal; and the switching signal is running free once the synchronous signal is not inputted.

9. The switching control circuit as claimed in claim 8, further comprising a signal converter coupled to the oscillation circuit, wherein the signal converter receive a feedback signal of the power converter, and the feedback signal modulates the frequency of the oscillation signal.

10. The switching control circuit as claimed in claim 8, wherein the synchronous input signal is coupled from the output of another switching control circuit.

11. The switching control circuit as claimed in claim 8, wherein the oscillation signal is. synchronized with the synchronous input signal once the first signal is generated.

12. The switching control circuit as claimed in claim 8, wherein the synchronous input circuit comprises:

a debounce circuit for receiving the synchronous input signal and generating an input signal in accordance with synchronous input signal; and a one-shot circuit coupled to the debounce circuit for generating the first signal in response to the rising edge of the input signal, wherein the pulse width of the first signal is shorter than the pulse width of the input signal.

13. The switching control circuit as claimed in claim 8, wherein the oscillation circuit comprises:

a capacitor for generating a ramp signal;

a first charge current coupled to the capacitor;

a first discharge current coupled to the capacitor;

a second charge current coupled to the capacitor;

a second discharge current coupled to the capacitor; and an oscillation control circuit coupled to the capacitor and the synchronous input circuit for generating the oscillation signal, a sync-charge signal, and a sync-discharge signal in response to the ramp signal and the first signal.

14. The switching control circuit as claimed in claim 13, wherein the oscillation control circuit comprises:

a first flip-flop for generating the oscillation signal, wherein the oscillation signal is enabled when the ramp signal is lower than a first trip-point voltage, and the oscillation signal is disabled when the ramp signal is higher than a second trip-point voltage;

a second flip-flop for generating the sync-discharge signal, wherein the sync-discharge signal is enabled in response to the enable of the first signal, and the sync-discharge signal is disabled when the ramp signal is lower than the first trip-point voltage; and a third flip-flop for generating the sync-charge signal, wherein the sync-charge signal is enabled in response to the enabling of the first signal, and the sync-charge signal is disabled when the ramp signal is higher than a third trip-point voltage, wherein the third trip-point voltage is higher than the second trip-point voltage, and the second trip-point voltage is higher than the first trip-point voltage.

15. A control circuit of a power converter, comprising:

an oscillation circuit coupled to a synchronous input circuit for receiving an output from the synchronous input circuit and generating an oscillation signal in response to a synchronous input signal;

a signal converter receiving a feedback signal of the power converter for modulating the frequency of the oscillation signal in response to the feedback signal, wherein the oscillation signal is utilized to generate the switching signal of the power converter, and the switching signal is synchronized with the synchronous input signal.

16. The control circuit as claimed in claim 15, wherein the synchronous input signal is coupled from the output of another control circuit.

17. The control circuit as claimed in claim 15, wherein the synchronous input circuit comprises:

a debounce circuit for receiving the synchronous input signal and generating an input signal in accordance with the synchronous input signal; and a one-shot circuit coupled to the debounce circuit for generating a first signal in response to the rising edge of the input signal, wherein the pulse width of the first signal is shorter than the pulse width of the input signal.

18. The control circuit as claimed in claim 15, wherein the oscillation circuit comprises:

a capacitor for generating a ramp signal;

a first charge current coupled to the capacitor;

a first discharge current coupled to the capacitor;

a second charge current coupled to the capacitor;

a second discharge current coupled to the capacitor; and an oscillation control circuit coupled to the capacitor and the synchronous input circuit for generating the oscillation signal, a sync-charge signal, and a sync-discharge signal in response to the ramp signal and the synchronous input signal.

19. The control circuit as claimed in claim 18, wherein the oscillation control circuit comprises:

a first flip-flop for generating the oscillation signal, wherein the oscillation signal is enabled when the ramp signal is lower than a first trip-point voltage, and the oscillation signal is disabled when the ramp signal is higher than a second trip-point voltage;

a second flip-flop for generating the sync-discharge signal, wherein the sync-discharge signal is enabled in response to the synchronous input signal when the ramp signal is lower than the first trip-point voltage; and a third flip-flop for generating the sync-charge signal, wherein the sync-charge signal is enabled in response to the synchronous input signal when the ramp signal is higher than a third trip-point voltage, wherein the third trip-point voltage is higher than the second trip-point voltage, and the second trip-point voltage is higher than the first trip-point voltage.

20. A controller of a power converter, comprising:

a synchronous input circuit for receiving a synchronous input signal; and an oscillation circuit coupled to the synchronous input circuit for receiving an output from the synchronous input circuit and generating an oscillation signal in response to the synchronous input signal, wherein the oscillation signal is utilized to generate the switching signal of the power converter, and the switching signal is synchronized with the synchronous input signal immediately after the synchronous input signal is inputted.

21. The controller as claimed in claim 20, wherein the switching signal is synchronized with the synchronous input signal within one switching cycle of the switching signal once the synchronous input signal is inputted.

22. The controller as claimed in claim 20, further comprising a signal converter coupled to the oscillation circuit, wherein the signal converter receives a feedback signal of the power converter for modulating the frequency of the oscillation signal.

23. The controller as claimed in claim 20, wherein the synchronous input signal is coupled from the output of another controller.

24. The controller as claimed in claim 20, wherein the synchronous input circuit comprises:

a debounce circuit for receiving the synchronous input signal and generating an input signal in accordance with synchronous input signal; and a one-shot circuit coupled to the debounce circuit for generating the first signal in response to the rising edge of the input signal, wherein the pulse width of the first signal is shorter than the pulse width of the input signal.

25. The controller as claimed in claim 20, wherein the oscillation circuit comprises:

a capacitor for generating a ramp signal;

a first charge current coupled to the capacitor;

a first discharge current coupled to the capacitor;

a second charge current coupled to the capacitor;

a second discharge current coupled to the capacitor; and an oscillation control circuit coupled to the capacitor and the synchronous input circuit for generating the oscillation signal, a sync-charge signal, and a sync-discharge signal in response to the ramp signal and the synchronous input signal.

26. The controller as claimed in claim 25, wherein the oscillation control circuit comprises:

a first flip-flop for generating the oscillation signal, wherein the oscillation signal is enabled when the ramp signal is lower than a first trip-point voltage, and the oscillation signal is disabled when the ramp signal is higher than a second trip-point voltage;

a second flip-flop for. generating the sync-discharge signal, wherein the sync-discharge signal is enabled in response to the synchronous input signal when the ramp signal is lower than the first trip-point voltage; and a third flip-flop for generating the sync-charge signal, wherein the sync-charge signal is enabled in response to the synchronous input signal when the ramp signal is higher than a third trip-point voltage, wherein the third trip-point voltage is higher than the second trip-point voltage, and the second trip-point voltage is higher than the first trip-point voltage.

* * * * *